US011580595B2

(12) United States Patent
Tsuboi

(10) Patent No.: US 11,580,595 B2
(45) Date of Patent: Feb. 14, 2023

(54) SYSTEM AND METHOD FOR VIRTUAL CURRENCY REMITTANCE

(71) Applicant: Ken Tsuboi, Tokyo (JP)

(72) Inventor: Ken Tsuboi, Tokyo (JP)

( * ) Notice: Subject to any disclaimer, the term of this patent is extended or adjusted under 35 U.S.C. 154(b) by 0 days.

(21) Appl. No.: 16/333,967

(22) PCT Filed: Sep. 5, 2017

(86) PCT No.: PCT/JP2017/031957
§ 371 (c)(1),
(2) Date: Mar. 15, 2019

(87) PCT Pub. No.: WO2018/051847
PCT Pub. Date: Mar. 22, 2018

(65) Prior Publication Data
US 2019/0251624 A1    Aug. 15, 2019

(30) Foreign Application Priority Data
Sep. 15, 2016    (JP) .................................. 2016-181032

(51) Int. Cl.
*G06Q 40/02* (2012.01)
*G06Q 20/06* (2012.01)
(Continued)

(52) U.S. Cl.
CPC ........... *G06Q 40/02* (2013.01); *G06Q 20/065* (2013.01); *G06Q 20/108* (2013.01); *H04L 9/08* (2013.01);
(Continued)

(58) Field of Classification Search
CPC .... G06Q 40/02; G06Q 20/065; G06Q 20/108; H04L 9/08; H04L 63/0414; H04L 2209/56; G06F 21/6245
(Continued)

(56) References Cited

U.S. PATENT DOCUMENTS

| | | | | |
|---|---|---|---|---|
| 2009/0271313 | A1* | 10/2009 | Chaudhari et al. .... | G06Q 40/00 705/39 |
| 2010/0306092 | A1* | 12/2010 | Wilkes ................... | G06Q 40/00 705/34 |
| 2015/0363770 | A1* | 12/2015 | Ronca et al. ........ | G06Q 20/382 |

FOREIGN PATENT DOCUMENTS

| | | | | |
|---|---|---|---|---|
| JP | 2002-351864 A | * | 12/2002 | ............. G06F 17/21 |
| JP | 2006-031578 A | * | 2/2006 | ............. G06Q 50/00 |

(Continued)

OTHER PUBLICATIONS

Tobias Adrian et al., The Rise of Digital Money, Jul. 2019, IMF FinTech Note No. 19_01. (Year: 2019).*
(Continued)

*Primary Examiner* — Bennett M Sigmond
*Assistant Examiner* — George N. Proios
(74) *Attorney, Agent, or Firm* — Studebaker & Brackett PC

(57) ABSTRACT

[Object] The object is to present a technical solution for a bank to disclose information on a deposit account directly to a third party.
[Solution Means] The owner of a virtual currency address or real-currency deposit account provides a disclosure key to a disclosee (third party). The third party accesses a disclosure server 6 by operating a disclosee terminal 7, and transmits a disclosure request with the disclosure key. The disclosure server 6 accesses to an opener bank server 1, 8, acquires the virtual currency address owner information or the instant real-currency deposit account balance information, transmits it to the disclosee terminal 7, and make it browsable on the disclosee terminal 7.

8 Claims, 12 Drawing Sheets

(51) Int. Cl.
  *G06Q 20/10* (2012.01)
  *H04L 9/08* (2006.01)
  *H04L 29/06* (2006.01)
  *H04L 9/40* (2022.01)

(52) U.S. Cl.
  CPC ...... *H04L 63/0414* (2013.01); *H04L 2209/56* (2013.01)

(58) Field of Classification Search
  USPC .......................................................... 705/37
  See application file for complete search history.

(56) References Cited

FOREIGN PATENT DOCUMENTS

| | | | | | |
|---|---|---|---|---|---|
| JP | 2008-040561 | A | | 2/2008 | |
| JP | 2008-304962 | A | * | 12/2008 | ............. G06Q 40/00 |
| JP | 2010-250745 | A | | 11/2010 | |
| JP | 2013-054487 | A | | 3/2013 | |
| JP | 2015-064667 | A | * | 4/2015 | ............. G06Q 40/02 |

OTHER PUBLICATIONS

The Future of Currency in a Digital World, Jun. 2018, IMF F&D Magazine (Year: 2018).*
International Search Report issued in PCT/JP2017/031957; dated Dec. 5, 2017.
Written Opinion issued in PCT/JP2017/031957; dated Dec. 5, 2017.
The extended European search report issued by the European Patent Office dated Feb. 21, 2020, which corresponds to European Patent Application No. 17850750.5-1213 and is related to U.S. Appl. No. 16/333,967.
Written Opinion issued by the the Singapore Patent Office (dated Sep. 4, 2020), which corresponds to Singaporean Patent Application No. 11201902320P and is related to U.S. Appl. No. 16/333,967.
An Office Action mailed by the Japanese Patent Office dated Nov. 24, 2020, which corresponds to Japanese Patent Application No. 2016-181032 and is related to U.S. Appl. No. 16/333,967.
Communication pursuant to Article 94(3) EPC issued by the European Patent Office on Jul. 30, 2021, which corresponds to European Patent Application No. 17850750.5-1213 and is related to U.S. Appl. No. 16/333,967.

* cited by examiner

Account Information File

| Virtual Currency Address | Gateway ID | Owner Name | Owner Address | Disclosure Key |
|---|---|---|---|---|
| abacd················ | xyz········ | TOKKYO Taro | ·····, Minato-ku, Tokyo | pqr····· |
| efgh················ | lmn········ | Jitsuyo Co. Ltd. | ·····, Minato-ku, Tokyo | ghq····· |
| | | | | |

Account Information File

| Account ID | Bank ID | Bank Name | Branch ID | Branch Name | Account Type | Account Number | Owner ID | Owner Name | Owner Address | Email Address | Permission Setting Key |
|---|---|---|---|---|---|---|---|---|---|---|---|
| aabb··· | xx11··· | ABC Bank | 0123 | EFG Branch | Saving | 112233 | xyz····· | ISHO Jiro | ···, Shibuya-ku, Tokyo | isho@aaa.ne.jp | opq···· |
| ccdd··· | yy22··· | XYZ Bank | 0055 | HIJ Branch | Checking | 445566 | abc······ | Shohyo Corporation | ···, Shinjuku-ku, Tokyo | xyz@mark.co.jp | ghi···· |
| ··· | | | | | | | | | | | |

Fig. 7

Permission Information File

| Permission ID | Disclosure Key | Disclosure Type | Disclosure Term |
|---|---|---|---|
| ab20160001 | abxy11··· | 3 | 30 |
| ab20160002 | xycd22··· | 2 | 60 |
|  |  |  |  |

SYSTEM AND METHOD FOR VIRTUAL CURRENCY REMITTANCE

TECHNICAL FIELD

The invention of this application relates to a deposit account information disclosure system that discloses information on a deposit account to a third party other than the owner of the account.

TECHNICAL BACKGROUND

Information on bank deposit accounts is widely understood as one that should be kept confidential. As the number of such crimes as bank transfer scams increases in recent years, the personal identification is required by the law in opening a new bank account, and information on bank accounts is held securely with personal information such as name and address.

Even when someone inquires to a bank whether a bank account exists or not as informing the name of a specific person or corporation, the bank never teaches the account number, and the bank never discloses such account information as the balance to the third party either. A bank account balance certification service is known. In this service, however, a balance certificate is delivered only to the owner of an account. There has been no concept that a bank discloses it directly to a third party.

PRIOR-ART REFERENCE

Patent Document

[Patent Document 1] JP, 2013-54487, A

SUMMARY OF THE INVENTION

Problem for the Invention to Solve

Nevertheless of the situation as above, the inventor considers that deposit account information disclosure by a bank directly to a third party would be very profitable.

Under this consideration, the invention of this application has the object to provide a technical solution for a bank to disclose deposit account information directly to a third party. "Directly" in this means exclusion of the disclosure route where it is disclosed to the account owner first and then disclosed to a third party as a result of the disclosure by the owner.

Means for Solving the Problem

To solve the described problem, the invention claimed in the claim 1 of this application is a deposit account information disclosure system that discloses information on a deposit account owned by an owner to a third party. This system has a disclosure server connected via a network with an opener bank server administrated by an opener bank having opened the deposit account. The disclosure server is operable to accept an access from an owner terminal being operated by the owner of the account and an access from a disclosee terminal being operated by the third party other than the opener bank. A disclosure program is implemented on the disclosure server. The disclosure program is operable to access the opener bank server, acquire the owner name of the deposit account or the instant balance of the deposit account, transmit the owner name or the instant balance to the disclosee terminal as the deposit account information, and make the deposit account information browsable on the disclosee terminal, when a disclosure request is transmitted from the disclosee terminal with deposit account identifying information.

Further to solve the described problem, the invention claimed in the claim 2 has the configuration where the deposit account identifying information is a virtual currency address, in the configuration in the claim 1. The opener bank server is a server administrated by a gateway of the virtual currency which is transacted at the virtual currency address. The disclosure program is operable to transmit who the owner of the virtual currency address is as the deposit account information.

Further to solve the described problem, the invention claimed in the claim 3 has the configuration where the disclosure program is operable to transmit the deposit account information only when an authentic disclosure key is transmitted from the disclosee terminal, in the configuration in the claim 2.

Further to solve the described problem, the invention claimed in the claim 4 has the configuration where the deposit account identifying information is the information identifying a deposit account at a city bank, in the configuration in the claim 1. The opener bank server is a server administrated by the city bank having opened the deposit account. The disclosure program is operable to acquire deposit account information, and transmit the deposit account information to the disclosee terminal. The deposit account information is the owner name and address, the balance of the deposit account at the time of the disclosure request, or the transaction history of the deposit account at the time of the disclosure request.

Further to solve the described problem, the invention claimed in the claim 5 has the configuration where the disclosure program is operable to transmit the deposit account information only when an authentic disclosure key is transmitted from the disclosee terminal, in the configuration in the claim 4.

Further to solve the described problem, the invention claimed in the claim 6 has the configuration where a permission information file is stored in a storage of the disclosure server, in the configuration in the claim 5. The information disclosure type shows which piece of the account information is disclosed of the account owner name and address, the deposit account balance at the time of the disclosure request, and the deposit account transaction history at the time of the disclosure request. The information disclosure type is recorded in the permission information file. The information disclosure type is recorded in the permission information file according to a selection on the owner terminal. The disclosure key is issued on an access from the owner terminal to the disclosure server, and is recorded in the permission information file as related to the information disclosure type. The disclosure program is operable to transmit the deposit account information to the disclosee terminal according to the information disclosure type relating to the disclosure key transmitted from the disclosee terminal.

Further to solve the described problem, the invention claimed in the claim 7 has the configuration where the disclosure server is operable to make the transmitted deposit account information browsable on the disclosee terminal as certifies authenticity of the transmitted deposit account information, in the configuration of the claim 1, 2, 3, 4, 5 or 6.

Effect of the Invention

As described below, by the invention as claimed in the claim 1, the system is utilized preferably when it is needed to know deposit account information in real time for a third party, because the owner name or the balance of the deposit account is disclosed in real time to the third party.

By the invention claimed in the claim 2, additionally, a technique configuration that can contribute to the future spread of virtual currencies is provided, because a third party learns who the owner of a virtual currency address is.

By the invention claimed in the claim 3, additionally, anonymity, which is a merit of virtual currencies, does not decrease much, because information on a virtual currency address is disclosed only when an authentic disclosure key is transmitted.

The invention claimed in the claim 4, additionally, has the effect of preventing fraudulent remittances, and the effect of being referred preferably in providing a credit to an owner, because information on a deposit account at a city bank is disclosed in real time to a third party.

The invention claimed in the claim 5 additionally has the effect that deposit account information is never disclosed to any person whom the owner does not wish, because the information is disclosed only when an authentic disclosure key is transmitted.

The invention claimed in the claim 6 additionally has the effect that deposit account information to be disclosed is limited within the range an owner considers necessary, because the information is disclosed according to the disclosure type which the owner has selected.

The invention claimed in the claim 7 additionally has the effect that the reliability of the disclosed deposit account information is raised, because authenticity of the disclosed information is certified by the disclosure institution.

BRIEF DESCRIPTION OF DRAWINGS

FIG. 7 is a schematic view showing an example of account information files in the second embodiment.

MODE TO PRACTICE THE INVENTION

Each mode in practicing the invention, embodiment, is described next. In the following description, two different embodiments are referred mainly. The first embodiment is the system disclosing information on deposit accounts used for virtual currency transactions. The second embodiment is the system disclosing information on deposit accounts of not virtual currencies but of real currencies, i.e., deposit accounts at city banks.

Figure 1:
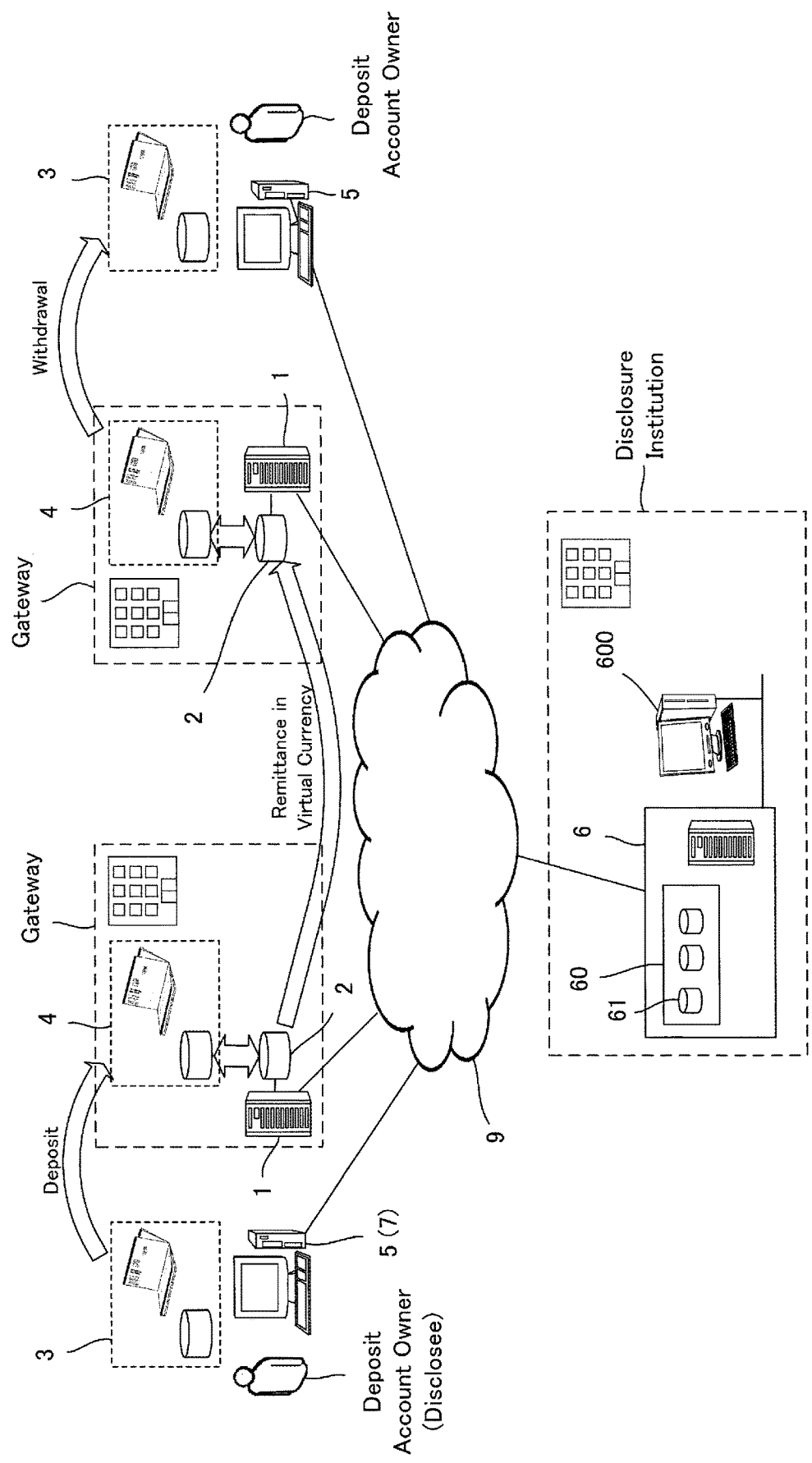
FIG. 1 is a schematic view of the deposit account information disclosure system in the first embodiment.

To begin with, the deposit account information disclosure system in the first embodiment is described. FIG. 1 is a schematic view of the deposit account information disclosure system in the first embodiment.

In the first embodiment, deposit account information to be disclosed concerns a virtual currency. As well known, virtual currencies are based on the block chain technique. Those are the schemes to deal information delivered through the Internet as currencies. Some virtual currencies have been commercialized, being slightly different schemes. In FIG. 1, Ripple is taken as one example.

In Ripple, as well known, virtual currencies such as USD and JPY, which are, as it were, imitation of national currencies, circulate on the Internet. These virtual currencies are hereafter referred as "individual virtual currencies". In addition, the inherent virtual currency named XRP (bridge currency) circulates on the Internet. XRP and each individual virtual currency are exchanged at instant exchange rates.

In Ripple, as shown in FIG. 1, a gateway exists as an organization to coordinate a real currency and a virtual currency. In Ripple, a gateway is an exchanger of a real currency and a virtual currency, and an organization carrying out remittance and receipt of the virtual currency.

More specifically, a user makes an application to a gateway. In this, a real currency is remitted from a user's real currency deposit account 3 to a gateway's real currency deposit account 4. When the application is accepted, a wallet 2 is issued to the user. The wallet 2, which is a kind of data collection, is sometimes called "ledger on the Internet".

A virtual currency address (i.e., Ripple address in this example) is also issued to the user. The virtual currency address corresponds to a public key in the encryption technology, being linked with the wallet 2 in one to one. The secret key is generated and issued in one-to-one correspondence with the virtual currency address. When the user makes a remittance of the real currency from his/her own deposit account 3 to the gateway's deposit account 4, the amount of an individual virtual currency corresponding to the remitted amount is recorded in the wallet 2. When a user in Japan makes an application to a gateway in Japan, JPY is recorded in his/her wallet 2. For instance, when 10,000 yen is remitted from his/her own bank account, 10,000 JPY is recorded in his/her wallet 2, i.e., dealt as deposited. In this, if the gateway charges fees for wallet issuing and exchanging, JPY is deposited after those are deducted therefrom.

Because actual remittances and receipts of an virtual currency are carried out between gateways, Ripple adopts the scheme where remittances of a virtual currency are carried out between servers 1 administrated by gateways, as shown in FIG. 1. These servers 1 are referred as "gate servers" hereafter in this specification. Concretely, a user (wallet owner) makes an access from his/her own terminal such as PC or smartphone, hereafter "owner terminal", to the gate server 1 of the gateway having opened his/her own wallet 2, in making a remittance. In accessing, the user inputs his/her virtual currency address. In instructing the remittance, the user inputs the virtual currency address of a remittee, the name of an individual virtual currency (XRP, JPY, USD or the like), and the amount of remittance. Thus, when the user inputs his/her own secret key and instructs the remittance, the gate server 1 carries out the remittance to the virtual currency address of the remittee.

In Ripple, concretely, each virtual currency address contains information to distinguish which gateway has issued it. The gate server 1 makes an access to the other gate server 1 of the other gateway having issued the virtual currency address of the remittee, and instructs to increase the remitted amount of the virtual currency in the wallet 2 of the remittee. Accompanied by this, the gate server 1 deducts the remitted amount of the virtual currency in the wallet 2 of the remitter.

Such a remittance of a virtual currency as described is usually carried out by a program for a web service (remittance service) provided by a gateway for users. This program, hereafter, "remittance program", is implemented on the gate server 1, and is available for customers of the gateway, i.e., users to whom they have issued wallets 2.

A remittance of a virtual currency as described is possible between addresses of the same individual virtual currency, and is also possible between addresses of different individual virtual currencies. For instance, when 1000 JPY is remitted between gateways existing in Japan, 1000 JPY is deducted from the wallet 2 of a remitter, and then 1000 JPY is added in the wallet 2 of a remittee. Otherwise, for instance, when a user in Japan remits 1000 USD to another user in US from his/her own virtual currency JPY, the amount of JPY corresponding to 1000 USD is deducted from the wallet 2 of the user in Japan according to the exchange rate at that time, and 1000 USD is added in the wallet 2 of the user in US.

The exchange rates between individual virtual currencies are decided by Ripple Labs Inc. which governs and administrates Ripple as a whole. Actually, the exchange rates between individual virtual currencies are decided through the exchange rates to the bridge currency (XRP). Because gateways charge commission, which may be cheap, in making remittances, it is deducted from the wallet 2 of a remitter together with an amount to be remitted, otherwise it may be deducted from the amount to be remitted to the wallet 2 of a remittee.

In Ripple as well as Bitcoin, all the remittances have been recorded in each blockchain (distributed database, sometimes called "ledger"), and all the verified blockchains have been opened to all users. Whereas "miners" carry out verification of each ledger competitively in Bitcoin, approved entities called "validators" carry out the verification of each ledger in Ripple. Validators have been designated as reliable entities in advance.

In a remittance of a virtual currency in Ripple, information on the remittee is only the virtual currency address as described. Information on the remitter is also only the virtual currency address. Information on the gateway having issued the virtual currency address could be obtained by analyzing the virtual currency address. But, the information on the owner of the virtual currency address cannot be known.

Such anonymity of remitters and remittees is the common nature of virtual currencies including Bitcoin, being the merit thereof. However, it is expected that such anonymity would rather become an obstacle in spreading virtual currencies more widely in the future. For instance, it is assumed that a virtual currency is used as a means of settlement in a trading between business entities. Business entity A issues an invoice to business entity B, and requests payment in a virtual currency. In this case, the name of the virtual currency, the amount to be paid (amount claimed) in the virtual currency, and the virtual currency address are stated in the invoice. Entity B who has received the invoice operates an owner terminal 5, and transmits an instruction to the gate server 1 so that the virtual currency of the claimed amount is remitted from the entity B's own wallet 2 to the stated virtual currency address, that is, makes a remittance processing done.

In the remittance processing, what is displayed on the owner terminal (entity B's terminal) 5 is only the virtual currency address of the remittee, and therefore there is no means to confirm that the virtual currency address is rightly of entity A. For instance, an employee X in entity A could forge an invoice, stating not entity A's virtual currency address but X's own. However, entity B cannot recognize it, making a remittance to X's own virtual currency address.

The deposit account information disclosure system in the first embodiment is in consideration of the described problems, which could happen in future virtual currency transactions. Concretely, this system has a server 6, hereafter referred as "disclosure server", to disclose deposit account information.

The disclosure server 6 is connected via a network 9 with an opener bank server administrated by a bank having opened a deposit account. In this embodiment, the opener bank is a gateway, the opener bank server is a gate server 1, and the deposit account is a wallet 2. Thus, information to be disclosed is the information on the owner of the virtual currency address for a specific wallet 2. In this embodiment, virtual currency address owners correspond to the deposit account owners in the invention. The network 9 may be the Internet.

In this embodiment, a disclosure program is implemented on the disclosure server 6. The disclosure program is operable to transmit information on a deposit account to a disclosee terminal 7, which is a terminal operated by a third party other than the owner of the deposit account, and to make it browsable thereon, when an access is made from the disclosee terminal 7.

In this embodiment, the disclosure server 6 is administrated by a reliable third-party institution. "Third-party" in "third-party institution" means that it is neither the opener (gateway) of a wallet nor a disclosee. This third-party institution is hereafter referred as "disclosure institution".

The disclosure server 6 has a storage 60. The storage 60 may be a hard disk drive implemented on the disclosure server 6, otherwise may be one implemented on another server, i.e., storage server, connected with the disclosure server 6.

Figure 2:
FIG. 2 is a schematic view showing an example of account information files in the first embodiment.

In the storage 60, an account information file 61 is stored. This file 61 is a database in which deposit account information is recorded. FIG. 2 is a schematic view showing an example of account information files in the first embodiment As shown in FIG. 2, the account information file consists of many records having fields of "Virtual Currency Address", "Gateway ID", "Owner Name", "Owner Address", "Disclosure Key", and so on. "Gateway ID" is the field in which the ID of the gateway having issued the virtual currency address is recorded. When the gateway has a virtual currency address, it may be recorded as the ID.

"Disclosure Key" is the field to record a password to confirm permission by a deposit account owner for deposit account information disclosure. The password here, which corresponds to a so-called secret key, is the key issued by the owner for the information disclosure in addition to the secret key for a virtual currency remittance. The disclosure key may be provided from the gateway when the wallet 2 is opened, otherwise it may be any desired key set by the deposit account owner.

Information recorded in the account information file 61 has been provided from the gateway to the disclosure institution in advance. In Ripple, a lot of gateways, though not all of, carry out the identity confirmation in issuing wallets 2, receiving personal information. This is the same as in opening deposit accounts at city banks. When the open application of a new wallet 2 is done, the gateway receives a copy of an identity confirmation document such as driver's license, and record the personal information in an administrative database file on the gate server 1. Then, the personal information is recorded in the administrative database file together with the issued virtual currency address. "Personal information" here means broadly, meaning registration information as for corporations. That is, a certified copy of registration is submitted as for a corporation. The corporate name and headquarter address are confirmed on it, and then those are recorded in the administrative database file as the personal information.

The gateway provides the information recorded in the administrative database file to the disclosure institution. A person in charge in the disclosure institution operates his/her terminal 600 and records the provided information in the account information file 61 on the disclosure server 6.

Disclosure of deposit account information is carried out by the disclosure program. The disclosure program is implemented on the disclosure server 6 in this embodiment. It is accessed and executed by the gate server 1 when a virtual currency is transacted.

Figure 3:
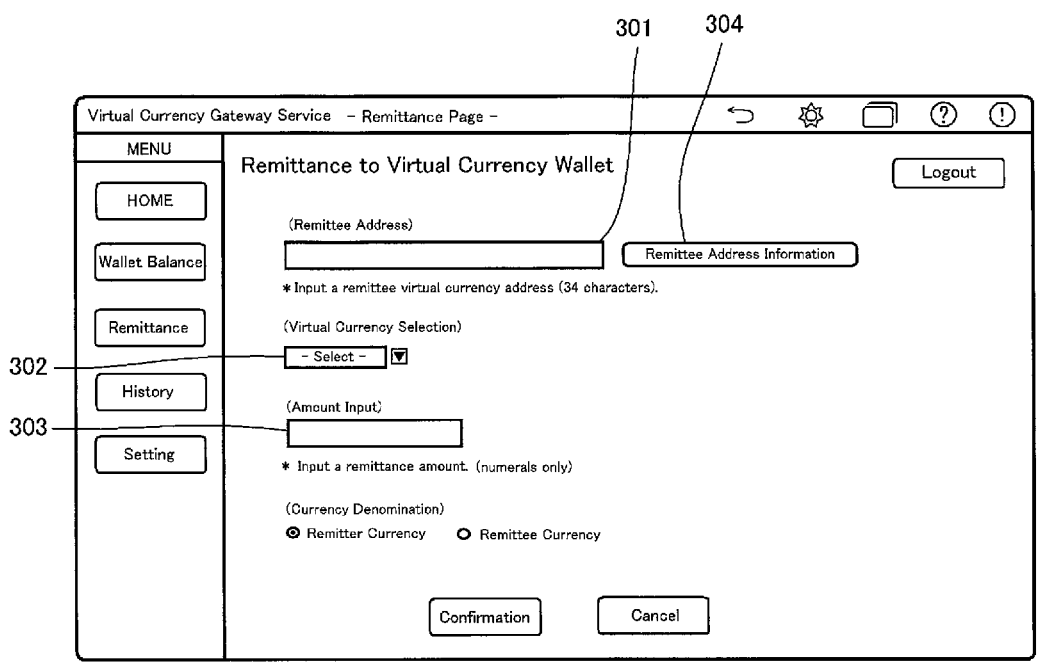
FIG. 3 is a schematic view showing disclosure of deposit account information in the first embodiment.

FIG. 3 is a schematic view showing disclosure of deposit account information in the first embodiment. The disclosure program is executed from a remittance program implemented on the gate server 1. This situation is schematically shown in FIG. 3.

The gateway issues a member ID and password to a deposit account owner whose wallet 2 has been opened. This member ID and password, which are for accessing the gate server 1, may be in common with the virtual currency address and the secret key thereof.

The deposit account owner inputs the member ID and password on the owner terminal 5 and then accesses the gate server 1. The gate server 1 transmits a HTML file of a remittance page to the owner terminal 5 to display. As shown in FIG. 3, the remittance page includes a box 301 in which a remittee virtual currency address is input, hereafter, "remittee address input box", a box 302 in which the name of a virtual currency is input, hereafter, "currency name input box", and a box 303 in which an amount to be remitted is input, hereafter, "amount input box".

A command button 304 captioned "Remittee Address Information" is provided to the right of the remittee address input box 301, hereafter, "disclosure request button". A disclosure key input page is linked to the disclosure request button 304.

Figure 4:
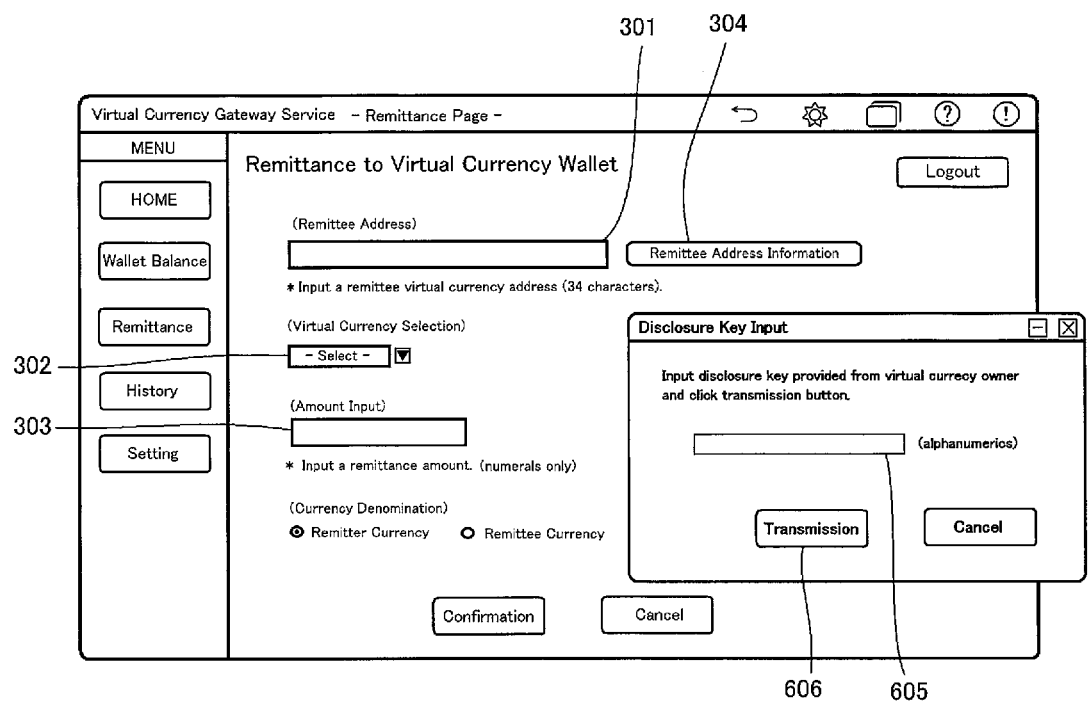
FIG. 4 is a schematic view showing an example of disclosure key input pages.

FIG. 4 is a schematic view showing an example of disclosure key input pages. In this embodiment, the disclosure key input page is hosted by the gate server 1, otherwise may be hosted by the disclosure server 6, i.e., a module of the disclosure program.

As shown in FIG. 4, the disclosure key input page includes a disclosure key input box 605 and a transmission button 606. The transmission button 606 is an execution button of the disclosure program on the disclosure server 6.

The disclosure program is executed with arguments, which are the virtual currency address input in the remittee address input box 301 and the disclosure key input in the disclosure key input box 302. Though not shown in the figures, the disclosure program is operable to search the account information file 61 with the passed virtual currency address, and to judge whether the value of the field "Disclosure Key" in the matching record corresponds to the passed disclosure key. When it corresponds, the disclosure program acquires each piece of the deposit account information in the record, lays them into a specific page (hereafter, "disclosure page"), sends the disclosure page back to the disclosee terminal 7, and make it displayed thereon.

Figure 5:
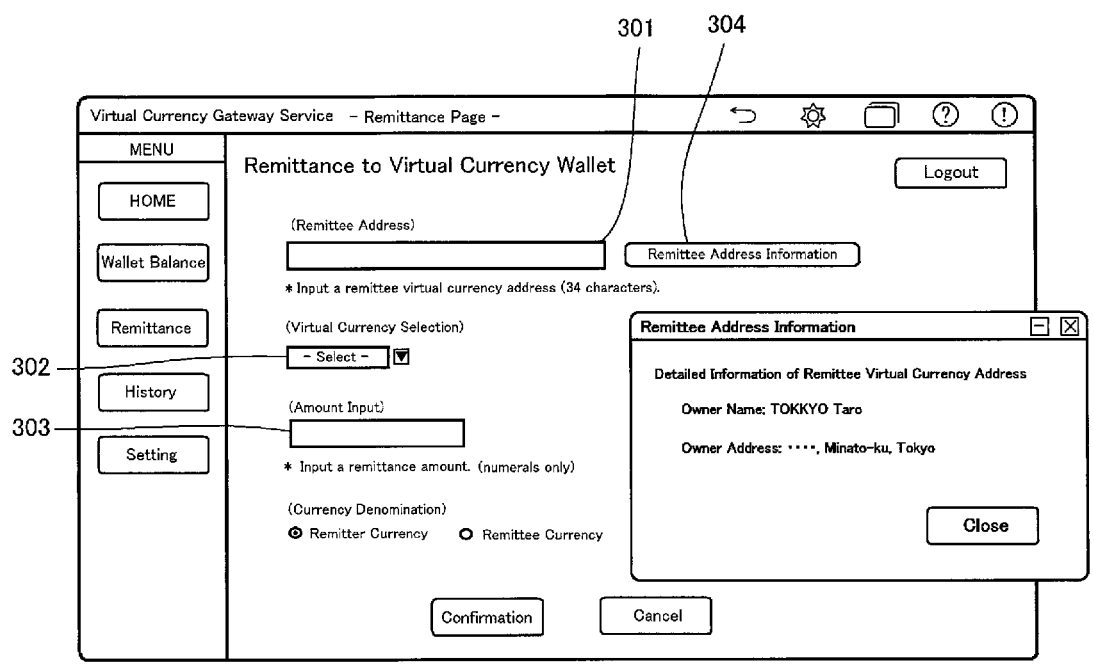
FIG. 5 is a schematic view showing an example of disclosure pages.

FIG. 5 is a schematic view showing an example of disclosure pages. As shown in FIG. 5, the disclosure page discloses information of the virtual currency address owner, as well as the input virtual currency address for confirmation. In this example, the name of the owner (personal name or corporate name) and the address or headquarter address are disclosed.

Following is description on an example of using the deposit account information disclosure system in the first embodiment. As well, it is assumed that business entity A issues an invoice to business entity B for instance, and requests the payment in a virtual currency. In this case, entity A and entity B have both been provided the wallets 2, having the virtual currency addresses. Entity A notifies the disclosure key to entity B in issuing the invoice. The disclosure key may be stated in the invoice, otherwise may be notified by an email as encrypted.

At least entity A notified the personal information to the gateway having opened his/her/their own wallet 2 when the opening application was submitted, and then the gateway provided the personal information to the disclosure institution. The disclosure institution recorded the provided personal information in the account information file 61.

A person in charge in entity B who has received the invoice makes an access to the gate server 1 by operating the disclosee terminal 7, inputs the virtual currency address, the virtual currency name and the amount of remittance in the remittance page, and then instructs the remittance. In this, the disclosure request button 304 is clicked or tapped (hereafter expressed "clicked" generically). As a result, the disclosure key input page is displayed. The disclosure key provided from entity A is input here, and the transmission button is clicked. As a result, the personal information of entity A is displayed on the disclosee terminal (entity B's terminal) 7 as shown in FIG. 5. After browsing the information and confirming correctness, the person in charge in entity B clicks a transmission button for the final remittance instruction.

According to the deposit account information disclosure system in the first embodiment, it is enabled to prevent fraudulent remittances of virtual currencies, because information on owners of virtual currency addresses is disclosed. In this, there is no problem of anonymity decrease which could happen in case of unrestricted disclosures, because information is disclosed only to an entity whom an owner has informed a disclosure key, i.e., only an entity whom an owner has allowed to disclose to.

Still, an embodiment of the present invention may have a configuration of disclosing without any permission by an owner. Although anonymity in virtual currency transactions decreases much in this configuration, it is preferable in view of preventing such crimes as money laundering, and is also preferable because reliability would rather be raised when information is disclosed, as seen in Facebook.

In the first embodiment, it is desirable that the disclosure institution discloses deposit account information as certifies it is authentic. That is, the disclosure institution obligates gateways to submit sufficient volume of sufficiently authentic information for the certification. If an owner is a natural person, for instance, it is required to submit a copy of his/her driver's license to the disclosure institution. In addition, it is required to submit a signature by a person in charge in the gateway to the disclosure institution. The person in charge makes the signature with the testimony that the personal identification has been made on the original driver's license. If an owner is a corporation, certificates of residence for all directors are required in addition to a certified copy of the corporate registration. It is preferable to give the certification only when sufficient volume of sufficiently authentic materials are submitted as described. In this, when a disclosure request is transmitted from a disclosee terminal 7, the owner information is transmitted back to be browsed even if no certification. If it has been certified, an exhibit of the certification, e.g., certification mark, is transmitted in addition to the owner information, so that the certification is confirmable on the disclosee terminal 7.

In certifying the owner information of a virtual currency address, moreover, the gateway having issued the virtual currency address may be examined. The gateway is regarded as highly reliable organization, for instance, if owners are obligated to submit sufficient volume of sufficiently authentic materials to the gateway as described, and if those pieces of information have been provided to the disclosure institution, and if sufficient volume of sufficiently authentic information and materials as for the gateway themselves, e.g., a certified copy of the company registration and certificates of residence for directors thereof, are submitted. In this, information on each transaction through the gateway may be provided to the disclosure institution to raise the reliability further. Because all transactions at the virtual currency address are open to the public, the transaction information here is mainly on transactions between the virtual currency and a real currency (depositing after exchanging the real currency to the virtual currency, and withdrawing after exchanging the virtual currency to the real currency).

In the configuration where gateways are examined in addition, ranking of gateways may be done by the disclosure institution. For instance, it is ranked as Level A when sufficient volume of sufficiently authentic information and materials on owners, on the gateway themselves and on each transaction thereon are submitted. It is ranked as Level B when information and materials securing some authenticity are submitted though the volume is small. Otherwise it is ranked as Level C. Since the ranking of gateways is also a kind of deposit account information, the present invention includes a mode where the ranking of gateways is disclosed as the deposit account information. In this case, it is still advantageous to disclose not owner information but only the ranking of gateways. This is because, for instance, reliability of a virtual currency address can be guessed if the ranking of the gateway having issued the virtual currency address is displayed when the virtual currency address has been stated as a remittee of the virtual currency. Such ranking information on gateways may be recorded in the deposit account information file 61 in advance, and is disclosed as well.

Figure 6:
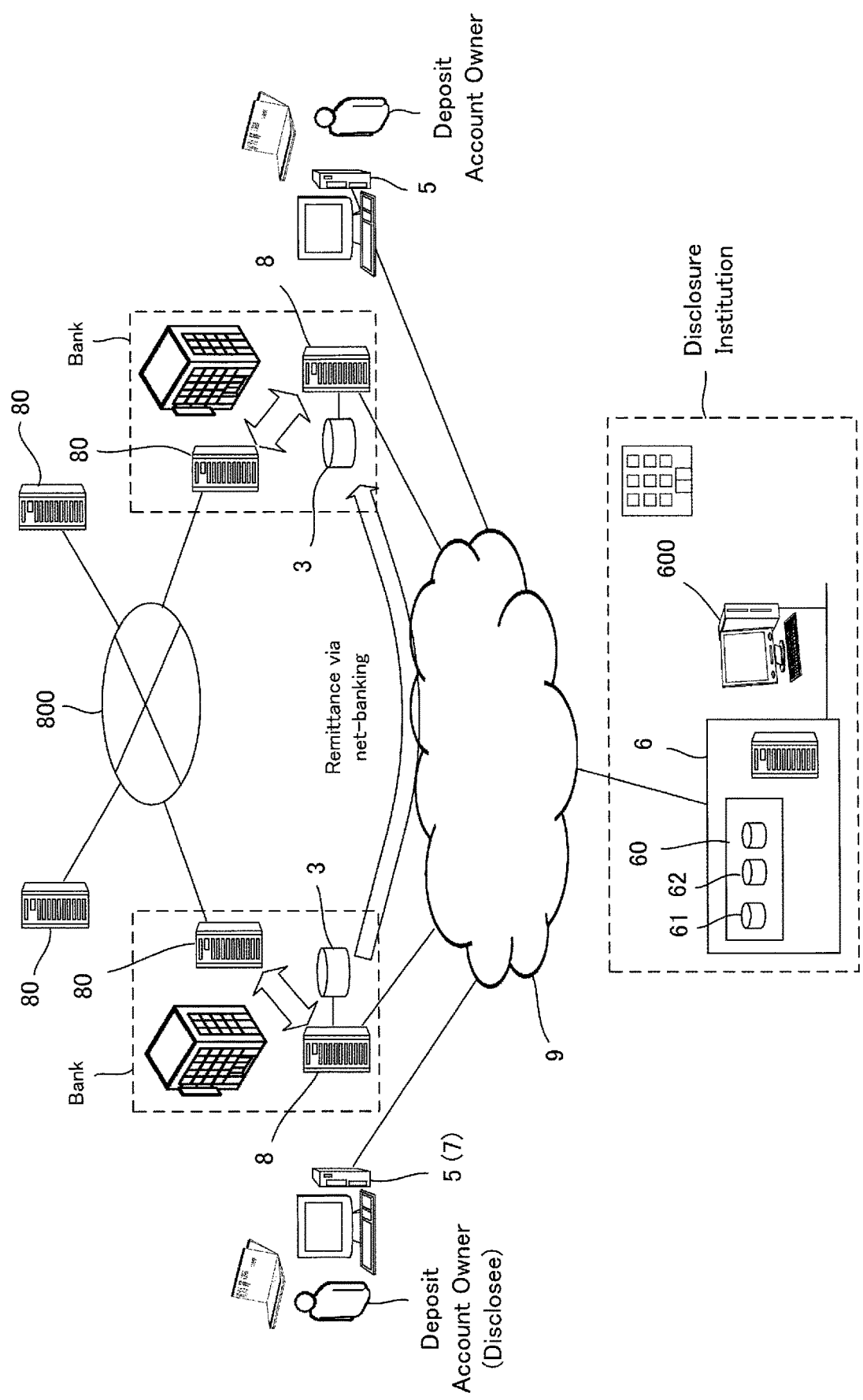
FIG. 6 is a schematic view of the deposit information disclosure system in the second embodiment.

Next, a deposit information disclosure system in the second embodiment is described. FIG. 6 is a schematic view of the deposit information disclosure system in the second embodiment.

In the second embodiment, a deposit account which information is disclosed is the deposit account of a real currency, that is, deposit account at a city bank. As shown in FIG. 6, the bank having opened a deposit account provides a transaction service via a network 9 (so-called net banking) for owners of deposit accounts. An owner accesses a server 8 of the bank (hereafter, "bank server") by operating his/her own terminal 5 (hereafter, "owner terminal"), and carries out confirmation of the account balance, a remittance to another deposit account, and so on.

Each bank administrates each bank server 8 respectively. Transactions such as net banking are carried out among the bank servers 8. In each bank, the bank server 8 is connected with a master server 80 that manages the master data of deposit accounts. The master servers 80 are connected with a large-scale inter-bank online system 800 such as BANCS (bank cash service), providing services of remittance and transferring in cooperation with ATM (automatic teller machine) and tellers' terminals at windows.

The system in the second embodiment discloses deposit account information in such a service by each bank for deposit account owners. In real currencies, some information on a deposit account owner is often voluntarily disclosed by the owner his/herself to others. Therefore, this embodiment doesn't disclose owner names further. The system in this embodiment discloses address information in real time in addition to the owner name, otherwise discloses a deposit account balance in real time. The configuration of disclosing a deposit account balance may include disclosure of the transaction history up to the current balance.

Specifically, the system in this embodiment also has a disclosure server 6, which is administrated by a disclosure institution as third-party institution. The disclosure institution is a neutral institution independent from each bank.

An account information file 61 is similarly stored in a storage 60 of the disclosure server 6. FIG. 7 is a schematic view showing an example of account information files in the second embodiment.

As shown in FIG. 7, the account information file is a database file that consists of many records having fields of "Account ID", "Bank ID", "Bank Name", "Branch ID", "Branch Name", "Account Type", "Account Number", "Owner ID", "Owner Name", "Owner Address", "Email Address", "Permission Setting Key", and so on. "Email Address" is the field where an deposit account owner's email address is recorded.

In this embodiment as well, a disclosure key is issued to a third party who wishes to receive a disclosure. The permission setting key is a key for the disclosure key. Because the disclosure key is issued based on the owner's permission, the permission setting key is the key to confirm the authority to permit. In this embodiment, the permission setting key is decided by the disclosure institution after an application is submitted from the owner, and notified to the owner via a registered mail or the like. The same information is recorded in the field "Permission Setting Key" in the deposit account information file 61.

After a service use application is done by an owner him/herself, each piece of information is recorded in the account information file 61. In accepting the application, the identity confirmation should be done from the viewpoint of preventing fraudulent applications by others. Moreover, an access key to the bank server 8, hereafter, "bank access key", is required for deposit account information disclosure. In this embodiment, therefore, a service use application is submitted to a bank, and is accepted upon the identity confirmation at a bank window.

After the identity confirmation, a person in charge at the bank window sends the account number, the account type, the owner name and so on to the disclosure institution. The bank access key for the disclosure server 6 to access the bank server 8 is also provided to the disclosure institution. A person in charge in the disclosure institution operates a person-in-charge terminal 600, adds a new record in the account information file 61, and records each piece of the provided information.

On the other hand, a permission information file 62 is stored in a storage 60 for the disclosure server 6. One permission information file 62 is created for each one deposit account registered on the disclosure server 6, i.e., for each one record in the deposit account information file 61, and then stored in the storage 60. For instance, the permission information file 62 is created adopting the account ID as its file name.

Figure 8:
FIG. 8 is a schematic view showing an example of permission information files.

FIG. 8 is a schematic view showing an example of permission information files. As shown in FIG. 8, the permission information file is a database file that consists of many records having fields of "Permission ID", "Disclosure Key", "Information Disclosure Type", and "Disclosure Term", and so on. The number of records in the permission information file corresponds to the number of the permission ID issued by the owner for one deposit account.

The field "Disclosure Key" is to input a secret key which the owner has provided to an disclosee for disclosure of the deposit account information. In this embodiment, the disclosure key is automatically generated by the disclosure program on the disclosure server 6, and is returned to the owner terminal 5.

The field "Disclosure Term" is to record the information on how long the transaction history is traced back in disclosing it. Whereas the span where the bank server 8 has accumulated is the longest term, a value is recorded by selecting from alternatives such as last one week, last two weeks, last one month, last three months, and the like.

"Information Disclosure Type" is the field to record an ID specifying what extent of the information is disclosed. For instance, the extent is chosen from 1: Owner Name and Address
2: Owner Name and Address and Balance, or
3: Owner Name and Address and Balance and Transaction History, and the information disclosure is permitted in this extent. Any of 1 to 3 is recorded in "Information Disclosure Type".

Figure 9:
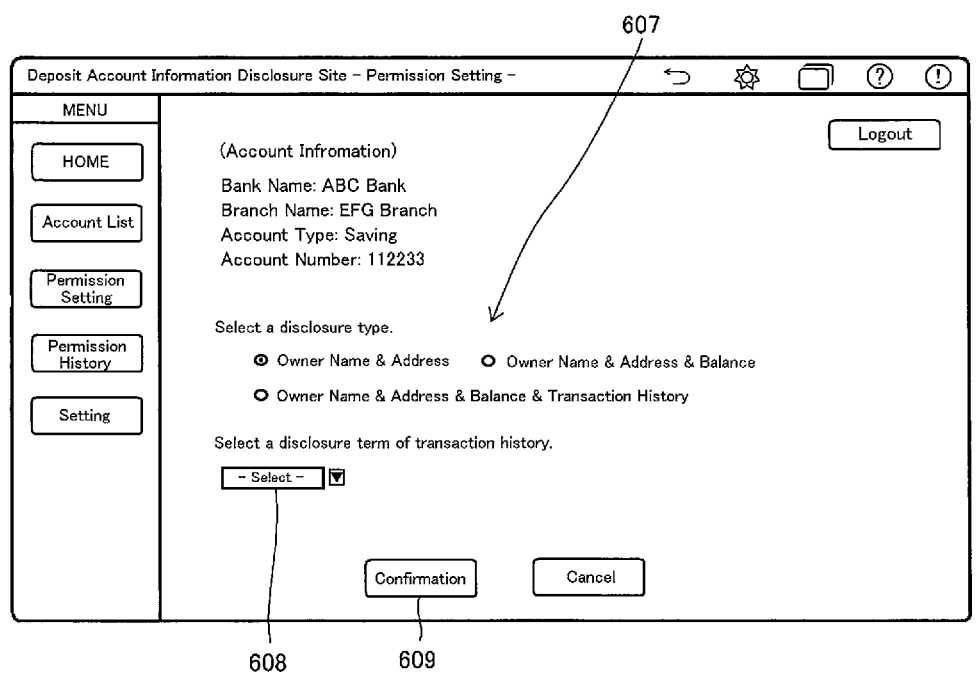
FIG. 9 is a schematic view showing an example of permission setting pages.

Such contents in the permission information file 62 are recorded when the owner accesses the disclosure server 6, inputs information in a special page (hereafter, "disclosure permission setting page"), and transmits to the disclosure server 6. This point is described below. FIG. 9 is a schematic view showing an example of permission setting pages.

The disclosure server 6 has provided a website (hereafter, "information disclosure site") for the deposit information disclosure. This website, which is a membership site, registers an owner membership when a service use application is done at a bank window, and issues a member ID and password. The member ID and password are delivered to the owner from the disclosure institution in an email to inform acceptance of the service use application.

Not shown in the figures, there is a button with such a caption as "Owner's Page" in the top page of the disclosure site. By clicking this, an input page for the member ID and password in the owner membership is displayed. When a transmission button is clicked after inputting the member ID and password correctly in this page, a login is made, and then the top page of a member area (hereafter, "member top page") is displayed.

The member top page includes a button captioned "Disclosure Permission Setting". By clicking this button, a list of deposit accounts which the member owns and has done service use applications for (that is, which have the corresponding records in the permission information file) is displayed. The list includes a button to select a deposit account in each line thereof. When either one is clicked, a permission setting page display program is executed with the account ID for the deposit account and the member ID in the login as the arguments, and then the permission setting page shown in FIG. 9 is displayed.

As shown in FIG. 9, the bank name of a selected deposit account, the branch name, the account type, the account number, and the owner name are displayed for confirmation in the permission setting page. The permission setting page display program is operable to search the deposit account information file 61 with the account ID, acquire these pieces of the information from the matching record, and lay them in the permission setting page to display.

As shown in FIG. 9, the permission setting page has an information disclosure type selection box 607. The box 607 is where any one is chosen from "Owner Name and Address", "Owner Name and Address and Balance", and "Owner Name and Address and Balance and Transaction History", being a radio button in this example.

Moreover, the permission setting page has a disclosure term input box 608. This box 608 is made enabled when the third disclosure type including transaction history is selected, and is made not enabled when any other disclosure type is selected. This input box 608, where the maximum value able to be input is the accumulation term at the bank server 8, may be, for instance, a pulldown list, in which a value is selected from "last one week", "last two weeks", "last one month", "last three months", or the like.

A permission setting program is implemented on the disclosure server 6. As shown in FIG. 9, the permission setting page includes a confirmation button 609. A display program of a page to confirm the input information is linked to the confirmation button 609. This page includes a transmission button, which is an execution button of the permission setting program. The permission setting program is operable to add a new record in the permission information file, and record each piece of information input in the permission setting page. Thus, the permission setting program is operable to generate the disclosure key automatically, create an email by laying the key in a prescribed mail text, acquire the email address from the account information file 61, and transmit the email to the email address. This email also includes a message saying the disclosure key is informed according to the disclosure permission setting, and a message saying it is asked to deliver the disclosure key to the permitted entity.

Next, disclosure of deposit account information using an issued disclosure keys is described.

In the second embodiment as well, disclosure of deposit account information is carried out by a disclosure program implemented on the disclosure server 6. In the second embodiment, the disclosure program can be executed in a disclosure site hosted by the disclosure server 6, otherwise can be invoked from other various services to be executed, as well as invoked in a remittance service by a bank server 8 (net banking) to be executed. In the following description, an execution in a disclosure site hosted by the disclosure server 6 is taken as an example.

The disclosure server 6 has hosted a website for deposit account information disclosure, hereafter, "disclosure site". A top page in the disclosure site includes a button with a caption such as "See Deposit Account Information". This button is linked with a page, hereafter "disclosure application page", where the information necessary for deposit account information browsing is input.

Figure 10:
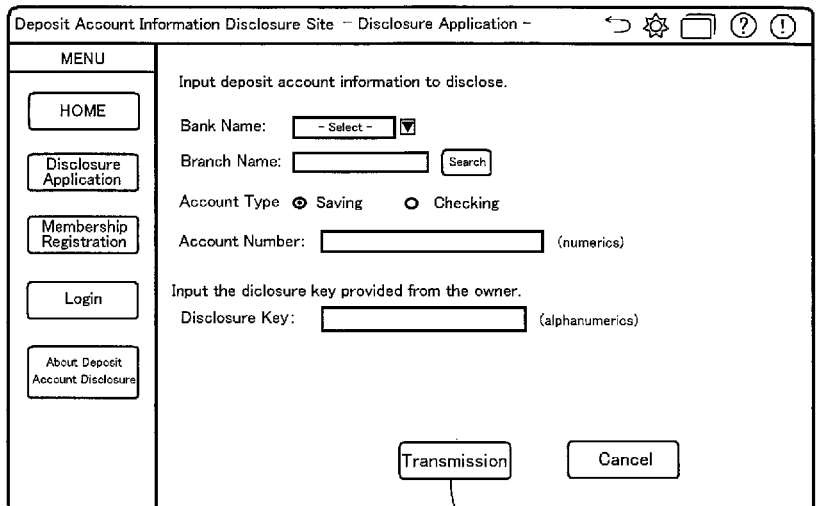
FIG. 10 is a schematic view showing an example of disclosure application pages.

FIG. 10 is a schematic view showing an example of disclosure application pages. As shown in FIG. 10, the disclosure application page includes input boxes for bank name, branch name, account type, account number, and disclosure key. The input boxes for bank name and account type are pull-down lists in this example. The input box for branch name is configured so that one is selected from candidates acquired by a partial matching search on the first input letter, because lots of branches usually exists. The input box for disclosure key usually allows only the alpha-numeric character input. A disclosure key provided to a disclosee by an owner is input therein.

Figure 11:
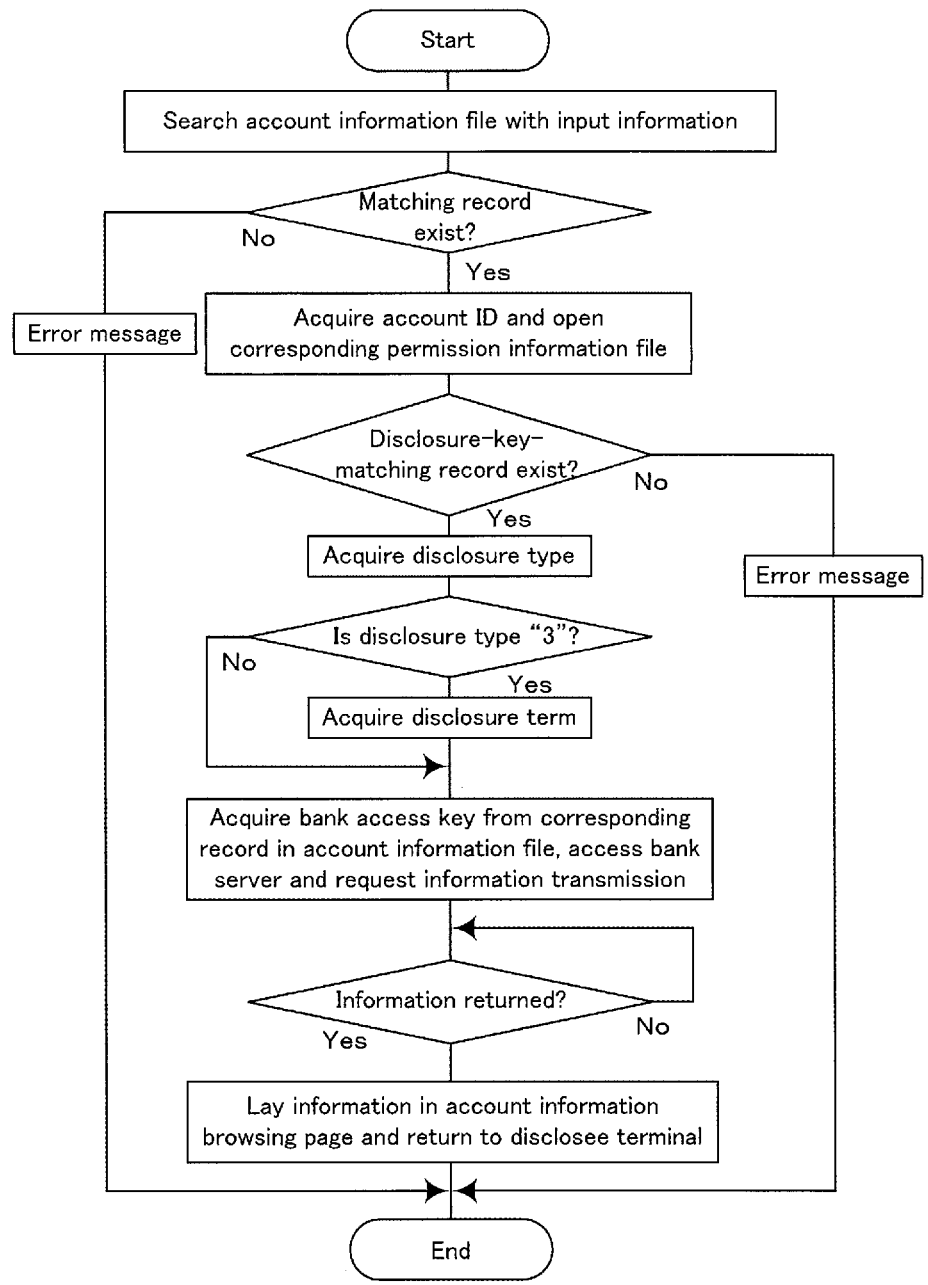
FIG. 11 is a flow chart showing the outline of a disclosure program.

The disclosure application page includes a transmission button 610, which is an execution button of the disclosure program. FIG. 11 is a flow chart showing the outline of the disclosure program.

As shown in FIG. 11, the disclosure program searches the account information file 61 with the input information, i.e., bank name, branch name, account type and account number, and then judges whether there is a matching record, that is, whether there is a deposit account matching all the input information. If not, the program ends, displaying an error message. If there is a record matching, the program opens the permission information file 62 created for the matching deposit account according to the account ID, and then judges whether there is a record where the value in the field "Disclosure Key" corresponds to the transmitted disclosure key. If no corresponding record, the program ends, displaying an error message saying it. If there is a corresponding record, the program acquires the information disclosure type from the record. If the information disclosure type is "3", the transaction term is acquired from the permission information file 62. Then the disclosure program acquires the bank access key from the record on the account ID in the account information file 61, and accesses the bank server 8 thereby.

The disclosure server 6 transmits the branch ID and account number to the bank server 8 together with the bank access key, and then requests to provide the deposit account information at that time according to the information disclosure type. Concretely, if the type is "1", the server 6 requests to provide the owner name and address, and if the type is "2", it requests to provide the balance at that time in addition. If the type is "3", it further requests the transaction history, transmitting the transaction term to the bank server 8.

After confirming the bank access key is authentic, the bank server 8 acquires each piece of the deposit account information at that time from the master server 80, and returns them to the disclosure server 6. When the deposit balance is returned from the bank server 8, for instance, the disclosure program lays the deposit balance in an account information browsing page, and sends it back to the disclosee terminal 7. The disclosure program ends with this.

Figure 12:
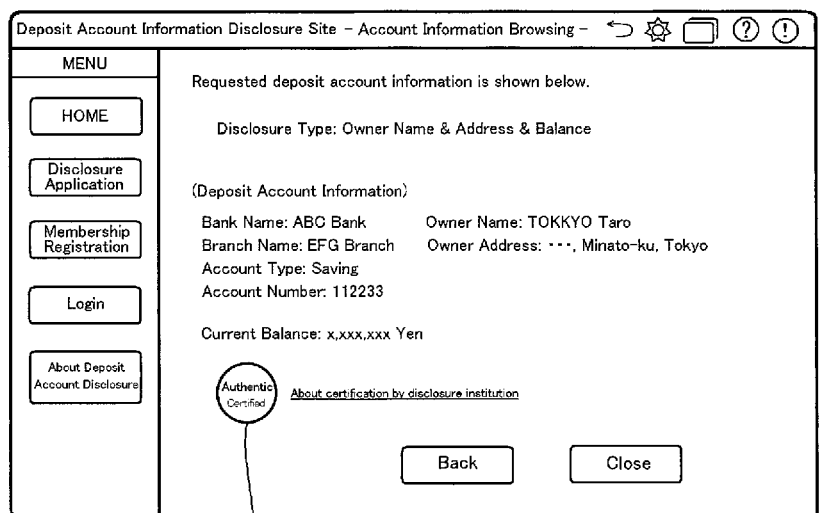
FIG. 12 is a schematic view showing an example of account information browsing pages hosted by the disclosure program.

FIG. 12 is a schematic view showing an example of account information browsing pages hosted by the disclosure program. As shown in FIG. 12, the account information browsing page displays, for instance, the updated deposit balance of the deposit account for which a disclosure application has been done on a disclosee terminal 7. In this, the account information browsing page displays that the disclosure institution certifies authenticity of the deposit account information. In this example, a mark 611, which the disclosure institution has established to exhibit the authenticity certification, is displayed together.

The disclosure institution is assumed to be a public organization such as Japanese Bankers Association, otherwise be an entity securing the public nature and neutrality as such. The information in the account information files 61 and others are also under the severe security management in the disclosure institution. Each bank is also obligated to guarantee information authenticity. Upon the administration as described, the disclosure institution certifies authenticity of deposit account information to a third party.

According to the deposit account information disclosure system in the second embodiment, deposit account information is disclosed to a third party via the network 9. In this, the third party can receive the disclosed information with a certain reliability, because the information is provided with the authenticity certification by the disclosure institution.

A more concrete situation is described below. In claiming a payment to a payer by issuing an invoice, for instance, information on a payee's deposit account is stated in the invoice. In this case, the statement includes the owner name and the account number of the deposit account, but not includes the address of the account. In remitting as well, inputting the address of the payee is not required. In this case, if a malicious person establishes a company of the same name and makes a deposit account opened, it could be possible to make a remittance to the deposit account deceptively. More concretely, there could be a fraud that an employee in a company establishes another company of the same name, makes a deposit account opened, and states the number of the deposit account in an invoice to make a remittance done deceptively to the account. In this case, the company address must be different because two companies with the same name cannot be established at the same address. By the system in this embodiment, even in this case, a person who has received the invoice can confirm the address of the account in the disclosure site. Thus, the address turns out to be different from the right one, and the fraud is perceived beforehand.

Moreover, the deposit account information disclosure system in the second embodiment is used preferably for a third party to confirm the balance of a deposit account in real time. For instance, when a third party should confirm the property situation of a deposit account owner for some reason, the deposit account owner may carry out permission setting in the permission setting page, and delivers the returned disclosure key to the third party by such a means as email forwarding. By inputting the disclosure key on the disclosee terminal 7, the third party can confirm the balance of the deposit account immediately. In this solution, it is possible to confirm the deposit balance just when the transmission button is clicked after inputting the disclosure key. That is, the real-time deposit balance confirmation is enabled.

For a third party to confirm a deposit balance, currently there is the method where a deposit balance certificate is issued by the bank and then the owner delivers it to the third party. However, because it takes about 7 to 10 days for a bank to issue a certificate, the information would be one about two weeks before due to the delivery via postal mail. According to the system in the second embodiment by contrast, it only takes the operation time of the disclosure server 6 and the bank server 8 after inputting the disclosure key and clicking the transmission button, and therefore the deposit balance can be confirmed with almost no time lag. Because the deposit balance is certified by the disclosure institution, moreover, the information is acceptable with almost the same reliability as of a deposit balance certificate issued by a bank. In giving much credit to a person, for instance, making a high-price contract, it might be necessary to know his/her property situation promptly. For such a case, the system in the second embodiment is preferably used.

In addition, the system in the second embodiment is used preferably also in an examination for financing by a non-bank financial institution. In getting a loan from the bank having opened a deposit account, the transaction situation of the deposit account can be known by the bank. However, a non-bank financial institution can hardly know it. In accepting a financing application from a deposit account owner, it is assumed to make his/her deposit passbook submitted. Because usually there is a time lag from a financing application to the examination of it, however, it is impossible to confirm the transaction situation in real time when the application is examined.

By using the deposit account information disclosure system in the second embodiment, it is possible to confirm the transaction situation of the deposit account up to that time. Therefore, the financial institution can carry out the examination more finely. As a result, the approval probability increases.

The second embodiment as described may adopt the configuration of locking the balance when balance information of a deposit account is disclosed. "Locking" here is to prohibit transactions reducing the balance, such as withdrawing, auto debiting, transferring, and so on.

Concretely, the system is configured so that a deposit account owner his/herself can set the transaction lock time in permitting a disclosure in the disclosure permission page. The field "Transaction Lock Time" is provided in the permission information file, and the permission setting program is operable to record the transaction lock time in this field. The disclosure program is operable to transmit the transaction lock time to the bank server 8 when it discloses the deposit balance after receiving the correct disclosure key.

In this case, the bank server 8 forwards the transaction lock time to the master server 80, sending a command to lock transaction of the deposit account. The transaction lock in the master server 80 is the same action as seizure of a deposit account for instance. Still, the transaction lock may be set with the exception where a remittance to the disclosee is allowed. In this solution, because the deposit balance is guaranteed for a certain period, the system is convenient when any kind of contract is made between a disclosee and a deposit account owner.

The second embodiment as described may adopt the configuration where deposit account information at a city bank is disclosed without any disclosure key. This configuration is not expected on the current common sense because anyone could see the balance and transaction history of a deposit account. However, making deposit account information opened completely would lead to, for instance, making management information transparent in a corporation, and would rather raise the social credibility of the corporation. Therefore, the above configuration would be positively adoptable.

In the second embodiment, it is preferable that a disclosure key has a time limit. That is, the disclosure server 6 is subjected to a time limit, e.g., 3 hours, 12 hours or 24 hours, after issuing a disclosure key. The disclosure program is programmed so as not to disclose the deposit account information after the time limit even if the key is authentic. This is in consideration of unauthorized leakage of disclosure keys. The same configuration may be adopted in the first embodiment.

In the second embodiment, owner addresses may be acquired from the account information file 61 without accessing the bank server 8, because those are recorded in the account information file 61 on the disclosure server. Acquisition of owner addresses by accessing the bank server 8 is still preferable, because an address acquired from the account information file 61 would be old if the address has changed and the change has been notified only to the bank.

DESCRIPTION OF SYMBOLS

1 Gate Server
2 Wallet
5 Owner Terminal
6 Disclosure Server
61 Account Information File
7 Disclosee Terminal
8 Bank Server
9 Network (the Internet)

What is claimed:

1. A system for virtual currency remittance comprising:
   a remitter gateway server administrated by a remitter gateway, the remitter gateway server being connected with a remitter's virtual currency wallet that is an electronical ledger on a network and linked with a remitter's virtual currency address issued by the remitter gateway, wherein a deposit by the remitter in a real currency is recorded converted into a virtual currency in the remitter's virtual currency wallet,
   a remittee gateway server administrated by a remittee gateway, the remittee gateway server being connected with a remittee's virtual currency wallet that is an electronical ledger on the network and linked with a remittee's virtual currency address issued by the remittee gateway, wherein a virtual currency in the remittee's virtual currency wallet is withdrawable by the remittee into a real currency,
   a disclosure server,
   a remittance page as a web page provided by the remitter gateway server to a remitter's terminal,
   a disclosure program implemented on the disclosure server,
   a storage on the disclosure server, and an account information file stored in the storage, the account information file being a database file in which each owner name of each virtual currency address, one or more disclosure keys, and each remittee's email address are recorded in correspondence with each virtual currency address,
   the remittance page including
      an amount input box in which an amount to be remitted is input,
      an address input box in which the remittee's virtual currency address is input, and
      a transmission button for carrying out a virtual currency remittance,
      by clicking or tapping the transmission button after inputting on the remitter's terminal a secret key that is in one-to-one correspondence with the remittee's virtual currency address, the remitter gateway server being operable to reduce the virtual currency in the remitter's virtual currency wallet by the amount input in the amount input box, and send the remittee gateway server an instruction to increase the virtual currency in the remittee's virtual currency wallet by an amount corresponding to the amount input in the amount input box,
   the remittance page further including
      a key input box in which a disclosure key of the one or more disclosure keys is input, and
      an execution button to execute the disclosure program with the remittee's virtual currency address input in the address input box and the disclosure key input in the key input box as arguments, wherein remittance transactions on the remittee's virtual currency address are recorded in at least one blockchain, the remittee's virtual currency address including no information of an owner name of the remittee's virtual currency address, the disclosure program is operable to search the account information file with the remittee's virtual currency address as the argument, and acquire a disclosure key of the one or more disclosure keys from a matching record in the account information file, and the disclosure program is further operable to acquire the owner name of the remittee's virtual currency address from the matching record in the account information file, transmit the owner name to the remitter's terminal displaying the remittance page, and make the owner name browsable on the remitter's terminal prior to clicking or tapping the transmission button for making the virtual currency remittance, based on the disclosure key as the argument matching the disclosure key acquired from the matching record, further comprising a permission setting program implemented on the disclosure server, and a web page provided by the disclosure server to a remittee's terminal operated by a remittee, the web page including a button to execute the permission setting program, wherein the permission setting program is operable to automatically generate a disclosure key of the one or more disclosure keys to be recorded in the account information file, create an email by laying the generated disclosure key in a prescribed mail text, acquire the email address of the remittee from the account information file, and transmit the email to the email address.

2. The system for virtual currency remittance of claim 1, wherein the disclosure server is operable to make the transmitted owner name browsable on the remitter's terminal with a mark showing certification of authenticity of the owner name.

3. The system for virtual currency remittance of claim 2, wherein the owner name of the remittee's virtual currency address has been provided by the remittee gateway, a ranking of the remittee gateway is recorded in correspondence with the virtual currency address in the account information file, and the disclosure server is operable to acquire the ranking of the remittee gateway from the matching record in the account information file, transmit the ranking to the remitter's terminal, and make the ranking browsable thereon.

4. The system for virtual currency remittance of claim 1, wherein the owner name of the remittee's virtual currency address has been provided by the remittee gateway, a ranking of the remittee gateway is recorded in correspondence with the remittee's virtual currency address in the account information file, and the disclosure server is operable to acquire the ranking of the remittee gateway from the matching record in the account information file, transmit the ranking to the remitter's terminal, and make the ranking browsable thereon.

5. A method for virtual currency remittance, comprising:

connecting a remitter gateway server administrated by a remitter gateway with a remitter's virtual currency wallet that is an electronical ledger on a network and linked with a remitter's virtual currency address issued by the remitter gateway, wherein a deposit by the remitter in areal currency is recorded converted into a virtual currency in the remitter's virtual currency wallet, connecting a remittee gateway server administrated by a remittee gateway with a remittee's virtual currency wallet that is an electronical ledger on the network and linked with a remittee's virtual currency address issued by the remittee gateway, wherein a virtual currency in the remittee's virtual currency wallet is withdrawable by the remittee into a real currency, providing a remitter's terminal with a remittance page as a web page by the remitter gateway server to display thereon, the remittance page including an amount input box, an address input box, a key input box, a transmission button, and an execution button to execute a disclosure program implemented on a disclosure server, making an amount of the virtual currency to be remitted from the remitter's virtual currency wallet input in the amount input box and the remittee's virtual currency address input in the address input box respectively in the remittance page displayed on the remitter's terminal, for a virtual currency remittance, by the remitter gateway server, reducing the virtual currency in the remitter's virtual currency wallet by the amount input in the amount input box, and sending the remittee gateway server an instruction to increase the virtual currency in the remittee's virtual currency wallet by an amount corresponding to the amount input in the amount input box, when the transmission button is clicked or tapped after inputting on the remitter's terminal a secret key that is in one-to-one correspondence with the remitter's virtual currency address, making a disclosure key input in the key input box in the remittance page displayed on the remitter's terminal, the disclosure key being one of one or more disclosure keys, and executing the disclosure program with the remittee's virtual currency address input in the address input box and the disclosure key input in the key input box as arguments when the execution button is clicked or tapped in the remittance page, wherein an account information file is stored in a storage on the disclosure server, and the account information file is a database file in which each owner name of each virtual currency address, the one or more disclosure keys, and each remittee's email address are recorded in correspondence with each virtual currency address, the method further comprises:

by the disclosure program, searching the account information file with the remittee's virtual currency address as the argument, and acquiring a disclosure key of the one or more disclosure keys from a matching record in the account information file, and by the disclosure program, acquiring an owner name from the matching record in the account information file, transmitting the owner name to the remitter's terminal, and making the owner name browsable on the remitter's terminal prior to clicking or tapping the transmission button for making the virtual currency remittance, based on the disclosure key as the argument matching the disclosure key acquired from the matching record, wherein remittance transactions on the remittee's virtual currency address are recorded in at least one blockchain, and the virtual currency address includes no information of an owner name of the remittee's virtual currency address, the method further comprises:

by the disclosure server, providing a web page to a remittee's terminal operated by a remittee, the web page including a button to execute a permission setting program implemented on the disclosure server, and by the permission setting program, automatically generating a disclosure key of the one or more disclosure keys to be recorded in the account information file, creating an email by laying the generated disclosure key in a prescribed mail text, acquiring the email address of the remittee from the account information file, and transmitting the email to the email address.

6. The method for virtual currency remittance of claim 5, further comprising:

by the disclosure program, displaying a mark showing certification of authenticity of the transmitted owner name on the remitter's terminal.

7. The method for virtual currency remittance of claim 6, wherein the owner name of the remittee's virtual currency address has been provided by the remittee gateway, a ranking of the remittee gateway is recorded in correspondence with the virtual currency address in the account information file, and the method further comprises:

by the disclosure program, acquiring the ranking of the remittee gateway from the matching record in the account information file, transmitting from the disclosure server the ranking of the remittee gateway to the remitter's terminal, and making the ranking browsable thereon.

8. The method for virtual currency remittance of claim 5, wherein the owner name of the remittee's virtual currency address has been provided by the remittee gateway, a ranking of the remittee gateway is recorded in correspondence with the virtual currency address in the account information file, and the method further comprises:

by the disclosure program, acquiring the ranking of the remittee gateway from the matching record in the account information file, transmitting from the disclosure server the ranking of the remittee gateway to the remitter's terminal, and making the ranking browsable thereon.

* * * * *